US011615380B2

(12) United States Patent
Runstedler et al.

(10) Patent No.: US 11,615,380 B2
(45) Date of Patent: *Mar. 28, 2023

(54) ELECTRONIC DEVICE AND METHOD FOR AUTOMATICALLY RESPONDING TO CALENDAR EVENT NOTIFICATIONS

(71) Applicant: BlackBerry Limited, Waterloo (CA)

(72) Inventors: Christopher James Runstedler, Cambridge (CA); Samer Fahmy, Kitchener (CA); Bartholomew Alexander Boeckner, Brantford (CA); Kieran Patrick Cunney, Guelph (CA); Jan Anthony Korsman, Heidelberg (CA); Jared Daniel Lepic, Waterloo (CA); Grant Ross Elliott, Hamilton (CA); Andrew Joseph Klamut, Waterloo (CA); Matthew Donald Hodgson, Kitchener (CA); Minh Pham, Kitchener (CA); Clifford Hung, Toronto (CA); Morgan Trevor McLaughlin, Kitchener (CA); Adam John Vaz, Waterloo (CA); Jeffrey Tyson Armstrong, Kitchener (CA); Daniel Ian Ackland, Waterloo (CA)

(73) Assignee: BlackBerry Limited, Waterloo (CA)

( * ) Notice: Subject to any disclaimer, the term of this patent is extended or adjusted under 35 U.S.C. 154(b) by 18 days.

This patent is subject to a terminal disclaimer.

(21) Appl. No.: 16/866,426

(22) Filed: May 4, 2020

(65) Prior Publication Data
US 2020/0265389 A1    Aug. 20, 2020

Related U.S. Application Data

(63) Continuation of application No. 15/214,341, filed on Jul. 19, 2016, now Pat. No. 10,643,186.

(51) Int. Cl.
*G06Q 10/1093* (2023.01)
*H04W 4/12* (2009.01)
(Continued)

(52) U.S. Cl.
CPC ....... *G06Q 10/1097* (2013.01); *G06F 3/0482* (2013.01); *G06Q 10/063116* (2013.01); *H04W 4/12* (2013.01)

(58) Field of Classification Search
CPC ........ G06Q 10/1097; G06Q 10/063116; G06F 3/0482
(Continued)

(56) References Cited

U.S. PATENT DOCUMENTS 6,101,480 A * 8/2000 Conmy ............... G06Q 10/109
705/7.18
7,933,789 B2    4/2011 Boland et al.
(Continued)

OTHER PUBLICATIONS

UA Connect "Microsoft Outlook 2010 for Windows: Calendaring", Jan. 2014, University Information Technology Services, pp. 1-55 (Year: 2014).*
(Continued)

*Primary Examiner* — Romain Jeanty
(74) *Attorney, Agent, or Firm* — Borden Ladner Gervais LLP; Todd Keeler (57) ABSTRACT

A method and an electronic device are provided that include receiving at the electronic device a start and an end of an out-of-office period and an out-of-office preference for responding to new invitations to events occurring during the out-of-office period received at the electronic device, receiving at the electronic device a new invitation to an event occurring during the out-of-office period, and automatically transmitting at the electronic device a response to the new invitation based on the out-of-office preference.

18 Claims, 6 Drawing Sheets

(51) Int. Cl.
*G06Q 10/0631* (2023.01)
*G06F 3/0482* (2013.01)

(58) Field of Classification Search
USPC ........................................................ 705/7.16
See application file for complete search history.

(56) References Cited

U.S. PATENT DOCUMENTS

| | | | |
|---|---|---|---|
| 8,205,163 | B2 | 6/2012 | Shaffer et al. |
| 8,352,961 | B2 | 1/2013 | Parker et al. |
| 8,620,710 | B2 | 12/2013 | Farrell et al. |
| 8,626,548 | B2 | 1/2014 | Patel |
| 8,886,732 | B2 | 11/2014 | Avitabile et al. |
| 9,064,244 | B2 | 6/2015 | Brauninger et al. |
| 9,369,416 | B2 | 6/2016 | Bos et al. |
| 9,978,043 | B2 | 5/2018 | Jon et al. |
| 2004/0064585 | A1* | 4/2004 | Doss .............. G06Q 10/063116 709/246 |
| 2005/0288987 | A1 | 12/2005 | Sattler et al. |
| 2007/0118415 | A1 | 5/2007 | Chen et al. |
| 2007/0250370 | A1* | 10/2007 | Partridge ....... G06Q 10/063116 705/7.14 |
| 2008/0091504 | A1* | 4/2008 | Lyle .................. G06Q 10/109 705/7.19 |
| 2008/0104175 | A1* | 5/2008 | Keohane .............. G06Q 10/107 709/206 |
| 2008/0114726 | A1* | 5/2008 | Keohane ................ G06F 16/58 |
| 2008/0133302 | A1 | 6/2008 | Brauninger et al. |
| 2010/0159967 | A1* | 6/2010 | Pounds .................. H04L 67/55 709/206 |
| 2010/0217644 | A1 | 8/2010 | Lyle et al. |
| 2011/0004503 | A1* | 1/2011 | Farrell ............... G06Q 10/1093 705/7.18 |
| 2011/0269439 | A1 | 11/2011 | Griffin et al. |
| 2014/0082098 | A1 | 3/2014 | Collins et al. |
| 2014/0172996 | A1* | 6/2014 | Deeter .................... H04L 51/24 709/206 |
| 2014/0288990 | A1* | 9/2014 | Moore ................. G06Q 10/107 705/7.19 |
| 2015/0095216 | A1* | 4/2015 | Van Heerden ......... G06Q 30/00 705/39 |
| 2015/0235178 | A1 | 8/2015 | Brauninger et al. |
| 2015/0347980 | A1 | 12/2015 | White et al. |
| 2016/0014056 | A1 | 1/2016 | Griffin |
| 2016/0134428 | A1 | 5/2016 | Ouyang et al. |
| 2016/0307166 | A1* | 10/2016 | Bradley ................ H04L 51/046 |

OTHER PUBLICATIONS

Ian "Project Plan for Paychex Out of Office Application", Apr. 2013, Rochester Institute of Technology Paychex, pp. 1-14 (Year: 2013).*
Tomoyuki, et al. "Meeting Scheduling System Using Unpleasant Notification", IEEE, Dec. 2013, pp. 1-4.
U.S. Appl. No. 15/214,341, First Non-Final Office Action dated Jun. 12, 2018.
U.S. Appl. No. 15/214,341, Notice of Allowance dated Dec. 13, 2019.
U.S. Appl. No. 15/214,341, Advisory Action dated Mar. 14, 2019.
U.S. Appl. No. 15/214,341, Final Office Action dated Dec. 28, 2018.
U.S. Appl. No. 15/214,341, Non-Final Office Action dated May 31, 2019.

* cited by examiner

ELECTRONIC DEVICE AND METHOD FOR AUTOMATICALLY RESPONDING TO CALENDAR EVENT NOTIFICATIONS

FIELD OF TECHNOLOGY

The present disclosure relates to electronic devices including, but not limited to, portable electronic devices for responding to calendar event invitations.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

The PIM applications on an electronic device may include a calendaring application utilized for organizing and scheduling events, as well as providing notifications regarding those scheduled events. When a user of the electronic device is going to be out of the office for a period of time, the user typically has to reschedule or cancel events that are scheduled during the out-of-office period.

Improvements in devices and scheduling events in a calendar application are desirable.

BRIEF DESCRIPTION OF THE DRAWINGS

Embodiments of the present disclosure will now be described, by way of example only, with reference to the attached figures, in which.

DETAILED DESCRIPTION

The following describes an electronic device and a method of automatically transmitting a response to an invitation to an event occurring within an out-of-office period in accordance with the disclosure on a portable electronic device. The method includes receiving at an electronic device a start and an end of an out-of-office period and an out-of-office preference for responding to new invitations to events occurring during the out-of-office period received at the electronic device, receiving at the electronic device a new invitation to an event occurring during the out-of-office period, and automatically transmitting at the electronic device a response to the new invitation based on the out-of-office preference.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

Figure 1:
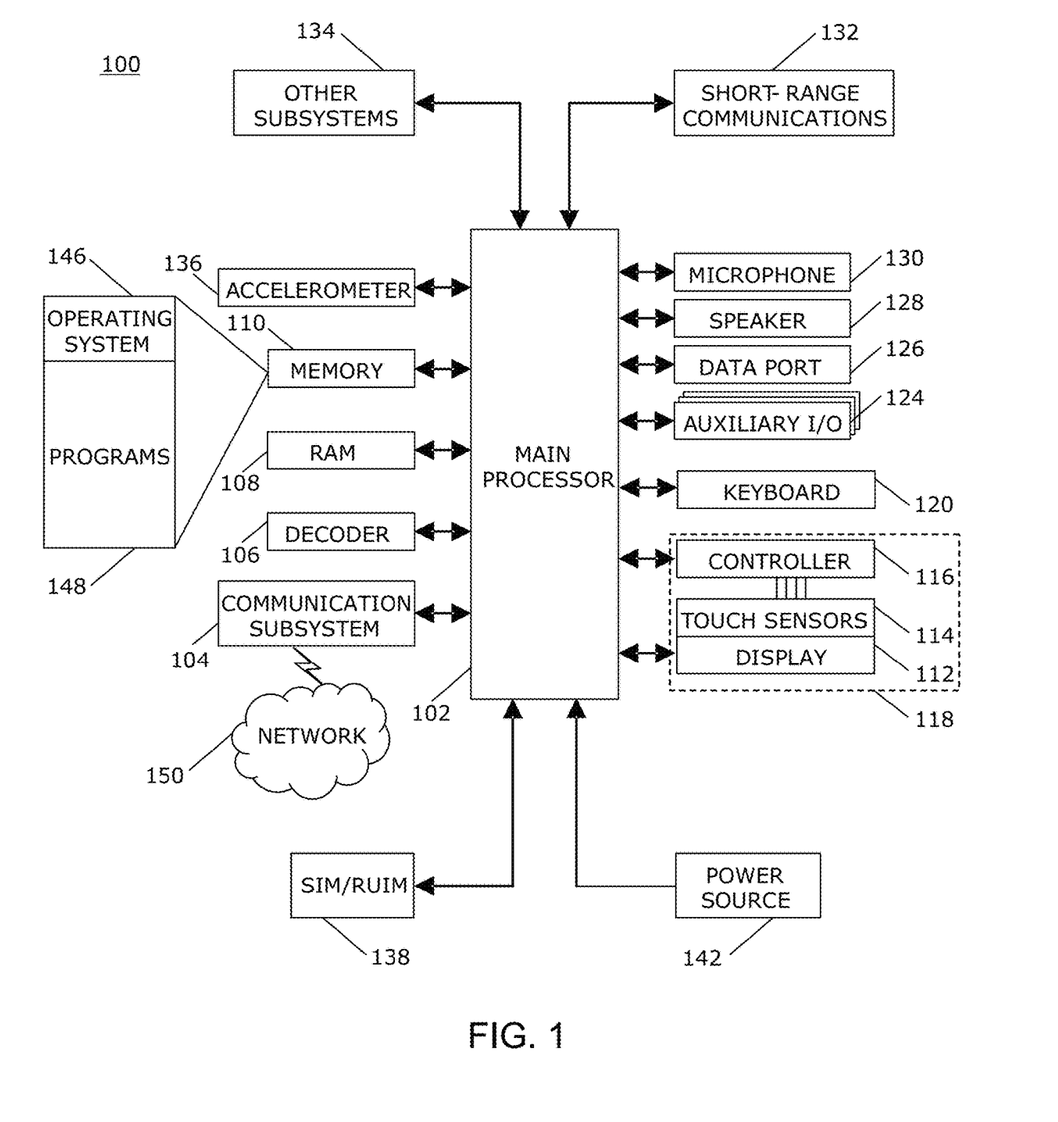
FIG. 1 is a block diagram of an example of a portable electronic device in accordance with the disclosure.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, one or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

One software program, application, or component 148 that may be stored in the memory 110 of the electronic device 100 is a calendaring application. The calendaring application may be utilized to store event data in, for example, the memory 110. The stored event data is associated with a scheduled event such as, for example, a meeting, an appointment, a task, and the like. The stored event data may include, for example, a name of the event, the start and end times of the event, the location, the organizer, the participants, the status of the participants such as, for example, attending, declined, or tentative, reminders, and notes associated with the event. The event data may be associated with a particular account of a user of the electronic device 100. For example, a user may have multiple different accounts associated with that user, and particular events, along with corresponding event data, may be associated with a particular one account associated with that user. For example, a particular event, along with corresponding event data, may be associated with a particular email account associated with the user, or may be associated with one of a "personal" account or a "work" account.

Event data associated with a scheduled event may be stored in response to receiving at the electronic device 100 an invitation to an event associated with the event data. The invitation may be received at the electronic device 100 via, for example, the communication subsystem 104. The invitation may be, for example, an attachment to an email or another form of communication received from an organizer of the event. An invitation typically includes selectable features that, when selected, enable a response to the invitation to be sent to the organizer of the event. The response typically indicates the user's intention regarding their attendance at the event associated with the invitation. Multiple selectable features may be included in the invitation, each selectable features associated with a respective intention such as for example, "attend", "decline", "maybe", and "tentative". By selecting one of the selectable features, a corresponding response may be sent to the organizer, either automatically or by generating a template response that a user may edit before sending.

Further, event data associated a scheduled event may be stored in response to a new event being created in the calendaring application by a user utilizing an input device, such as, for example, the touch-sensitive display 118, the keyboard 120, or both. The user of the electronic device 100 who creates the event may be designated at the "organizer" of the event. The invitation may be sent, by the communication subsystem 104 for example, to other participants. As described above, the invitation may be sent by the electronic device 100 as an attachment to an email or some other form of communication.

Figure 2:
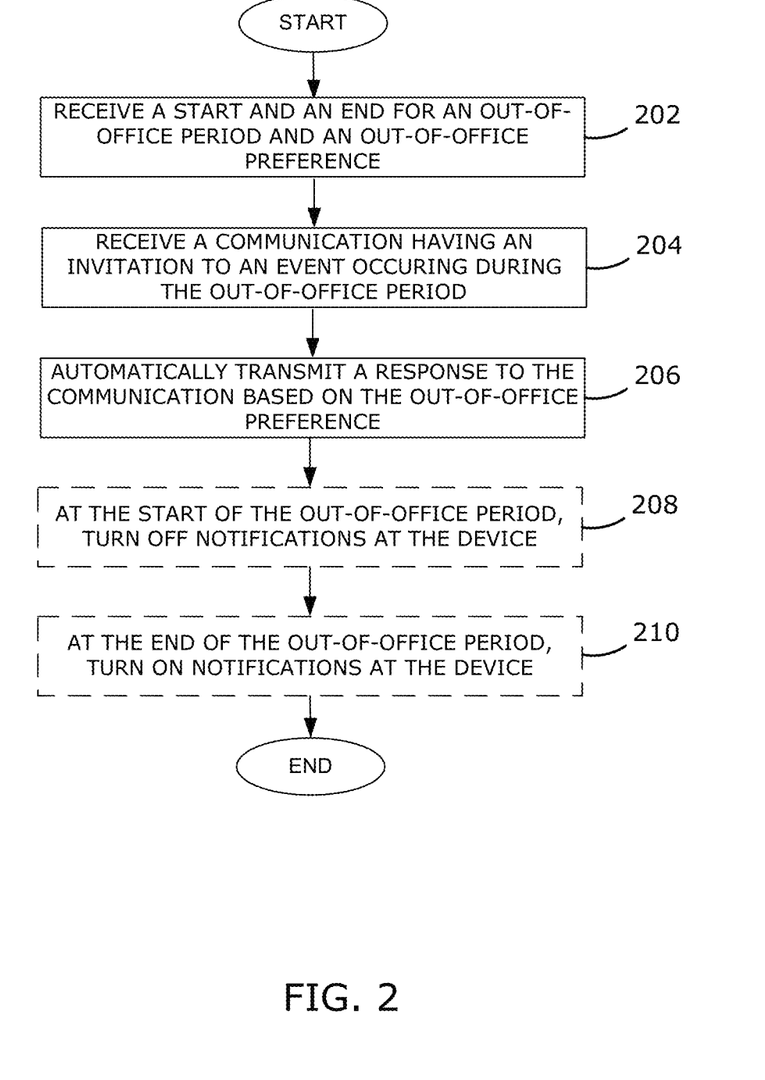
FIG. 2 is a flowchart illustrating a method of automatically transmitting a response to an invitation to an event occurring within an out-of-office period in accordance with the disclosure.

A flowchart illustrating a method of automatically transmitting a response to an invitation to an event occurring during an out-of-office period is shown in FIG. 2. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium.

At 202, a start and an end of an out-of-office period, as well as out-of-office preferences are received by the electronic device. The start and the end of the out-office-office period may include, for example, a first date associated with the day on which the user is first away from the office as the start, and a second date associated with the day on which the user is last away from the office as the end. The start or end, or both may also include times if the user is in the office for a portion of the first or last day of the out-of-office period.

The start and the end of the out-of-office period may be received as inputs via and input device of an electronic device 100, including the keyboard 120 or the touch-sensitive display 118, or both, as previously described. The input may be received via a user interface (UI) displayed on the display 112. Alternatively, the start and the end of the out-of-office period may be received from a server or some other electronic device separate from the electronic device 100. For example, a human resources department of an enterprise may utilize a vacation booking software tool for booking and tracking an employee's vacation time, which may be stored on a server in communication with the electronic device 100. When vacation time has been entered into the software tool, the start and the end of an out-of-office period may be received at the electronic device 100 via the communication subsystem 104. Once the start and end time is received, the user may be prompted to input the out-of-office preferences for the out-of-office period, or the out-of-office preference may be a default out-of-office preference stored on the device. When the start and the end of the out-of-office period are received from the software tool, the user may be prompted to enter the out-of-office preferences. The user may be prompted by receiving an email at the electronic device 100. The email may include a link to launch the UI in order for the user to input the out-of-office preferences.

As discussed in more detail below, the UI for entering the start, the end, and the out-of-office preferences may be provided as part of a calendaring application, or may be provided as part of another application that communicates and interfaces with the calendaring application. Alternatively, the UI may be provided as a stand-alone application for performing actions and configuring the electronic device 100 in preparation of an out-of-office period. As described in more detail below, the UI utilized to receive the start and the end of the out-office-period and the out-of-office preferences may be included within an out-of-office assistant application, also referred to herein as an out-of-office wizard.

The out-of-office preferences received at 202 include a preference for responding to new event invitations for events occurring during the out-of-office period. For example, the out-of-office preference may be selected from one of several response options such as, for example, "do nothing", "decline", and "suggest rescheduling". As discussed in more detail below, the out-office-preference may be selected in a UI.

At 204, a new invitation to an event that occurs during the out-of-office period is received at the electronic device 100. A "new invitation" is an invitation that is received after the start and the end of the out-of-office period, and the out-of-office preference, is received at the electronic device 100 at 202. The new invitation may be received as an attachment to an email or some other communication received at the electronic device 100. The new invitation may include event data for an event, which may be saved in associated with calendaring application. The event data may include, for example, a name of the event, the date, the start time and the end time of the event, the location, the organizer, and the participants.

In response to receiving the new invitation at 204, a response to the invitation is automatically transmitted at 206 based on the out-of-office preference received at 202. For example, if the "decline" response option is the received out-of-office preference at 202, then a response that declines the user's attendance at the event is automatically sent to the received invitation. Similarly, if the "suggest rescheduling" response option is the received out-of-office preference at 202, then a response suggesting that the event be rescheduled is automatically sent in response to receiving the new invitation. If the "do nothing" response option received as the out-of-office preference at 202, then no response will be automatically sent in response to the received new invitation.

Optionally, the response to the new invitation may be automatically transmitted at 206 only if a length of the out-of-office period meets a predetermined period. For example, the predetermined period may be a day such that a response to a new invitation for an event occurring within the out-of-office period is sent only if the length of the out-of-office period is at least one day. The predetermined period may be a default period or may be selectable by a user.

Optionally, the automatic response transmitted at 206 may include text. The text may be, for example, a default message associated with the out-of-office preference received at 202. The default message may be configured to automatically include information related to the out-of-office period based on received the start and the end received at 202. For example, the default message may indicate the date range that the user is out of the office, or the date on which the user is expected to return to the office. Alternatively, the text included in the automatic response may be received as an out-of-office preference at 202. For example, the user may enter the text to be included in the automatic response via, for example, a text box included in the UI utilized for entering the start and the end of the out-of-office period.

Additionally, the out-of-office preferences received at 202 may optionally include an account or accounts for which automatic responses are to be sent. For example, the user may desire that responses are automatically transmitted for invitations received via the user's work email address, but that responses are not automatically transmitted for invitations received via the user's personal email address.

Optionally, the out-of-office preference received at 202 may include other preferences such as, for example, turning off, or silencing, notifications, or alarms, or both during the out-of-office period. Notifications may include alerts regarding incoming emails, scheduled events, telephone calls, and so forth.

If the out-of-office preference includes the optional preference to silence notifications, or alarms, or both, during the out-of-office period, then the electronic device 100 turns off notifications, or alarms, or both at the start of the out-of-office period at 208 and, at 210, turns on the notifications, or alarms, or both at the end of the out-of-office.

By turning off notifications at the start of the out-of-office period, the number of notifications received by the user is reduced while the user away from the office such as, for example, when the user is on vacation without the user having to manually turn the notifications off. By turning on notifications at the end of the out-of-office period, the user is able to resume receiving these notifications once the out-of-office period ends without having to remember to manually turn on the notifications.

The out-of-office preferences may include a preference that notifications, or alarms, or both be turned off at 208 for a particular account or accounts such as, for example, the user's work accounts but not for other accounts such as the user's personal accounts. In another example, certain types of notifications may be turned off at 208. For example, the user may wish to disable notifications associated with incoming emails and scheduled events, but not disable notifications associated with alarms and reminders.

Portions of the method shown in FIG. 2 may be implemented by a UI. For example, receiving the start and end of the out-of-office period and the out-of-office preferences may be received via input from a user in a UI. The UI may be implemented as part of, for example, the calendaring application, or may be a stand-alone application that interfaces with other applications stored on the electronic device 100, such as the calendaring application. Additionally, the UI that implements portions of the method shown in FIG. 2 may be included within an out-of-office assistant, or out-of-office wizard, as described in more detail below.

Figure 3:
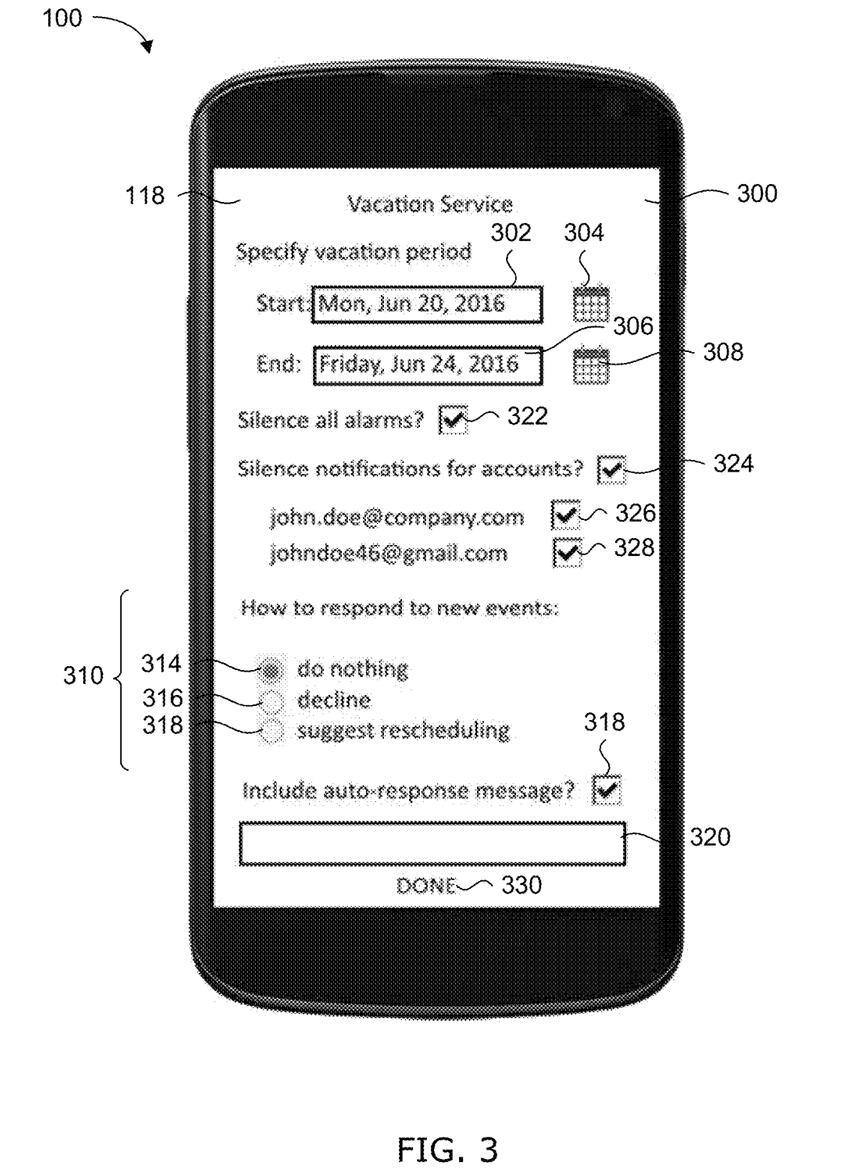
FIG. 3 illustrates an example of a user interface for receiving a start and an end of an out-of-office-period and out-of-office preferences in accordance with the flow chart of FIG. 2.

Reference is made to FIG. 3 with continued reference to FIG. 2 to describe an example of a UI 300 for inputting a start and an end of an out-of-office period and out-of-office preferences that are received at 202.

The UI 300 shown in FIG. 3 is displayed on a touch-sensitive display 118 of an electronic device. The UI 300 includes a start field 302 for entering the start of the out-of-office period. The start may be entered in the start field 302 by typing a start date utilizing, for example, a keyboard (not shown), or by selecting a start date utilizing the start calendar icon 304. The UI 300 includes an end field 306 for entering the end of the out-of-office period. Similar to the start field 302, the end may be entered in the end field 306 by inputting an end date in the end field by the keyboard (not shown), or by selecting an end date utilizing the end calendar icon 308.

As described above, the start date and the end date may be received from a server or some other electronic device separate from the electronic device 100. In this case, the start and the end may be automatically entered in the start field 302 and the end field 306, respectively, based on the start and end of the out-of-office period entered in, for example, a vacation booking software tool operated on the server or some other electronic device.

The UI 300 includes a field 310 for entering the out-of-office preference associated with responding to new invitations to events occurring within the out-of-office period. The field 310 shown in FIG. 3 includes a first selectable feature 312 associated with a "do nothing" preference, a second selectable feature 314 associated with a "decline" preference, and a third selectable feature 316 associated with a "suggest reschedule" preference. In the example UI 300 shown in FIG. 3, the selectable features 312, 314, and 316 are option buttons, however any suitable selectable elements may be included such as, for example, a single drop down menu. Also, although selectable features 312, 314, 316 associated with "do nothing", "decline", and "suggest reschedule" preferences are shown in the example UI 300, greater or fewer selectable features associated with a greater or fewer number of preferences may be included in the UI 300.

The UI 300 also includes a message selectable element 318 for inputting an out-of-office preference for a message to be included with the response that is automatically transmitted for a received new invitation to an event occurring within the out-of-office period. A text box 320 is included to receive input text to be included in an automatically transmitted response. The input text may be received from an input device such as, for example, a keyboard (not shown). Each of the preferences may have an associated default messages and, in this case, the text associated with the default message may be displayed in the text box 320 and may be edited by the user.

The example UI 300 includes additional optional features for receiving out-of-office preferences related to turning off alarms, turning off notifications, and selecting one or more accounts that the various actions apply to. In the UI 300, the alarm selectable feature 322 and the notification selectable feature 324 have been selecting, as indicated by the checks displayed in the check boxes associated with selectable features 322 and 324. The selection of the alarm selectable feature 322 and the notification selectable feature 324 results in the out-of-office preferences received at 202 to include preferences to turn off the alarm and the notifications, respectively, during the start of the out-of-office period, and turn the alarm and notifications back on at the end of the out-of-office period. Further, account selectable features 326 and 328, each associated with a respective email account, and may be utilized to select which accounts the automatic transmission of responses at 206 is applied to. In the example shown in FIG. 3, the UI 300 includes two accounts: a work email account, john.doe@company.com, associated with selectable feature 326, and a personal email account, johndoe46@gmail.com, associated with selectable feature 328. By selecting one or both of the selectable elements 326 and 328, the associated accounts are included in the out-of-office preferences received by the electronic device 100 at 202 as the accounts for which responses to new invitations are automatically transmitted. In addition, if either or both of alarms and notifications are selected by selectable features 322 and 324, the alarms and notifications that are turned off may be the alarms and notifications associated with the accounts selected by selectable features 326 and 328.

When the user has finished making all of the desired selections on the UI 300, the user may select the "DONE" button 330, which causes the electronic device 100 to receive the out-of-office preferences associated with the user's selections. After the out-of-office selections are received, the actions performed by the electronic device 100 in accordance with the out-of-office preferences, including receiving and automatically transmitting responses to new invitations, turning off alarms and notifications at the start of the out-of-office period, and turning on alarms and notifications at the end of the out-of-office period are performed as background operations of the electronic device 100.

Figure 4:
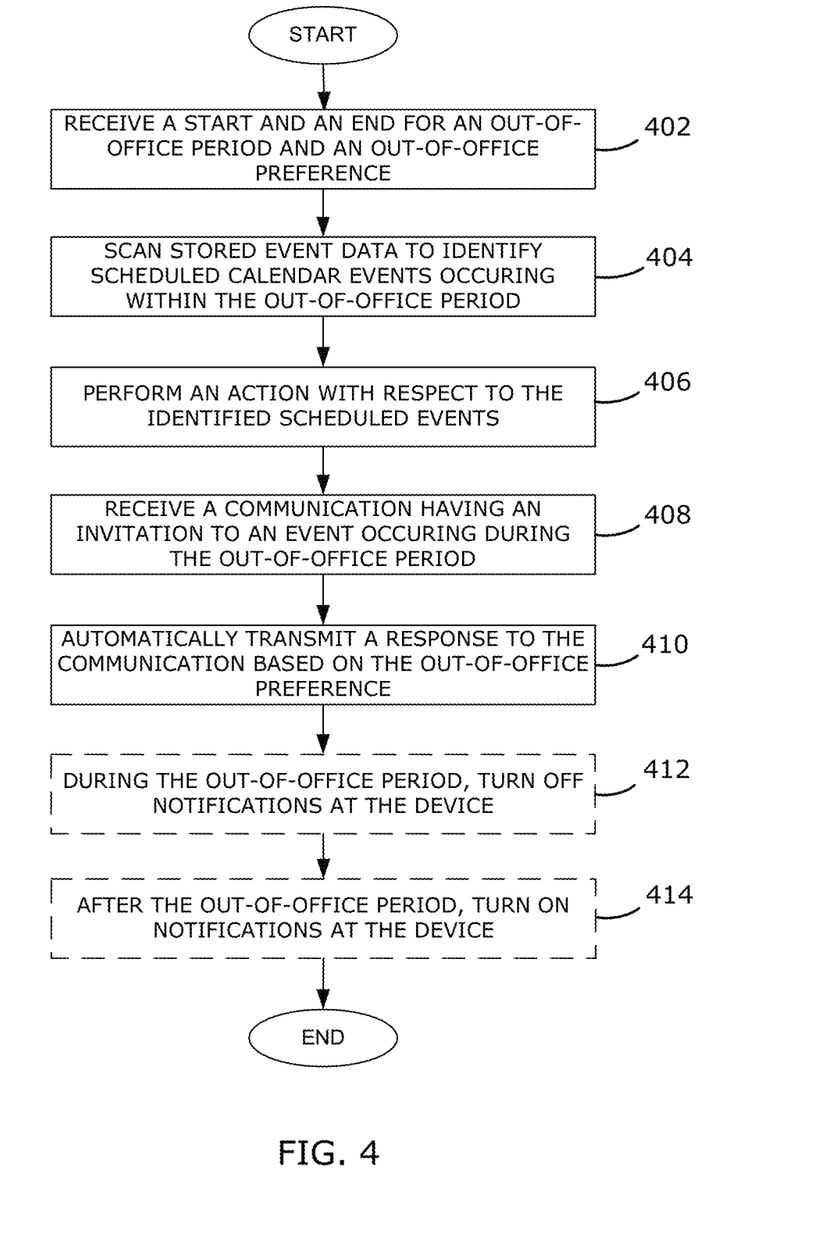
FIG. 4 is a flowchart illustrating a method of identifying scheduled events that occur in an out-of-office period and performing an action associated with identified scheduled events in accordance with the disclosure.

A flowchart illustrating an alternative method of automatically transmitting a response to an invitation to an event by an electronic device is shown in FIG. 4. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium.

A start and an end for an out-of-office period and an out-of-office preference are received at 402. Receiving the start and end and the out-of-office preference is substantially the same as receiving the start and end and the out-of-office preference at 203 as described above and therefore is not further described here to avoid repetition.

At 404, a scan of stored event data is performed to identify scheduled calendar events that occur within the out-of-office period is performed. A "scheduled calendar event" is an event for which associated event data is already stored at the time that the start and the end of the out-of-office period and the out-of-office preference are received at 402. The stored event data may be stored in association with a calendaring application on the electronic device 100, and may be stored on the electronic device 100. Alternatively, or additionally, the stored event data may be stored remotely from the electronic device 100, such as, for example, on a server that is in communication with the electronic device 100. Identifying the scheduled calendar events may include separately identifying scheduled calendar events for which the user is an organizer, and scheduled calendar events for which the user is a participant. The user may be the "organizer" of the identified scheduled event if, for example, the user created the event, or has been given permissions to edit or manage the event. The user may be a "participant" of the identified scheduled event if, for example, the user has not previously declined the event. For example, the user may be previously indicated an "attending", "tentative", or "maybe" status with respect to the scheduled event, or had not previously responded to an invitation to the scheduled event.

At 406, an action is performed with respect to the scheduled events identified at 404. In one example, the action may be automatically performed based on the out-of-office preferences. For example, the out-of-office preferences may cause all identified scheduled events for which the user is a participant to be declined or to request rescheduling. Declining the identified scheduled events may include automatically transmitting a response to the organizer of the event informing the organizer that the user has declined the scheduled event. In another example, the out-of-office preferences may cause the identified scheduled events for which the user is an organizer to be rescheduled or cancelled. Rescheduling or cancelling the scheduled event may include sending a response to the participants of the event to inform the participants that the event has been rescheduled or cancelled.

In an alternative embodiment, the action performed may be displaying the identified scheduled events to the user via the display 112. The identified scheduled events may be displayed in a list, or may be displayed sequentially one event at a time. The identified scheduled events may be grouped together for display based on whether the user is a participant of the event or the organizer of the event.

The identified scheduled events may be displayed in a UI that includes selectable features for the user to determine an action to be performed for each of the identified scheduled events. For example, for identified scheduled events for which the user is a participant, the UI may include selectable features to perform one of "do nothing", "decline", or "request rescheduling". In response to the user selecting one of the "decline" or "request rescheduling" selectable features, a response may be automatically transmitted to the organizer of the event to indicate that the user has declined or requested rescheduling. For identified scheduled events for which the user is an organizer, the UI may include selectable features to perform one of "cancel" the event, "reschedule" the event, or "do nothing". In response to the user selecting one of the "cancel" or "reschedule" selectable features, a message may be automatically transmitted by the electronic device to the participants of the event to indicate that the event has been cancelled, or rescheduled.

The UI may include selectable features for enabling a previously selected action for an identified scheduled event to be applied to subsequent scheduled events. For example, the UI may include a selectable feature to select the action previously selected for a similar event. For example, if the user previously selected "decline" for a scheduled event for which the user is a participant, a selectable feature may be displayed together with a next scheduled event for which the user is participant. Alternatively, or additionally, when an action is selected, a selectable feature may be presented to automatically apply the selected action to all similar identified scheduled events.

Additionally, the action performed at 406 may optionally include creating a reminder for a date after the end of the out-of-office period to remind the user to follow up on identified scheduled events. The action to create reminders may be performed in response to the received out-of-office preferences including a preference for creating reminders to follow up on events. The reminders may be created with respect to certain identified scheduled events only. For example, the reminders may only be created for identified scheduled events for which the response was to reschedule the event.

Optionally, in addition to identifying scheduled events occurring during the out-of-office period at 404, tasks and reminders occurring during the out-of-office period may also be identified. In this case, in addition to performing an action with respect to the identified scheduled events at 406, an action may be performed with respect to each of the identified tasks and reminders. The action performed with respect to the tasks and reminders may be performed automatically based on the out-of-office preferences. For example, the out-of-office preferences may include a preference that all tasks and reminders are moved to a date after the end of the out-of-office period. Alternatively, the identified tasks and reminders may be displayed on the display 112 together with selectable features for the user to select an action to perform with respect to each identified task and reminder. Identifying tasks and reminders and performing an action with respect to the identified tasks and reminders may involve integration between two or more applications on the electronic device 100. For example, if the method is implemented through the calendaring application, and tasks and reminders are stored with respect to another application such as, for example, a time management application, then identifying tasks and reminders by the calendaring application may be facilitated by integration with the time management application to access the tasks and reminders. If the method is performed by a stand-alone application, then integration with both the calendaring application and the time management application may be desired in order to scan the scheduled events and the tasks and reminders.

At 408, a new invitation to an event occurring within the out-of-office period is received at the electronic device 100. At 410, a response to the received new invitation is automatically transmitted by the electronic device based on the out-of-office preference. Optionally, notifications are turned off at the start of the out-of-office period at 412 and are turned on at the end of the out-of-office period at 414. Steps 408, 410, 412, and 414 are substantially similar to steps 204, 206, 208, and 210 described above with reference to FIG. 2 and therefore are not further described here to avoid repetition.

As described above with reference to FIG. 2, portions of the method shown in FIG. 4 may be implemented utilizing a UI. The UI may be included as part of an application on the electronic device or may be a stand-alone application that interfaces with, for example, a calendaring application. The UI may be included within an out-of-office wizard. The out-of-office wizard may include multiple pages that may be utilized to step a user through various actions that may be desirable to perform prior to an out-of-office period.

Reference is made to FIG. 5 through 8 with continued reference to FIG. 3 to describe an example of a displayed UI for automatically transmitting a response to an invitation to an event by an electronic device. In the example illustrated in FIG. 5 through FIG. 8, the UI that implements portions of the method shown in FIG. 4 is included within an out-of-office wizard. As with the UI 300 described with reference to FIG. 3, the UI is displayed on a touch-sensitive display 118 of an electronic device 100. However, UI shown in FIG. 5 through FIG. 8 includes multiple screens for additional actions at 406 with respect to the scheduled events identified at 404. In addition, because the UI shown in the example illustrated in FIG. 5 through FIG. 8 is included within an out-of-office wizard, the UI facilitates receiving additional out-of-office action preferences related to additional functionality. The additional functionality includes, for example, creating calendar events for dates within the out-of-office period, setting status of social communication applications, setting an automatic out-of-office reply to emails received in an email application, and sending a notification email notifying others of the user's upcoming out-of-office period.

Figure 5:
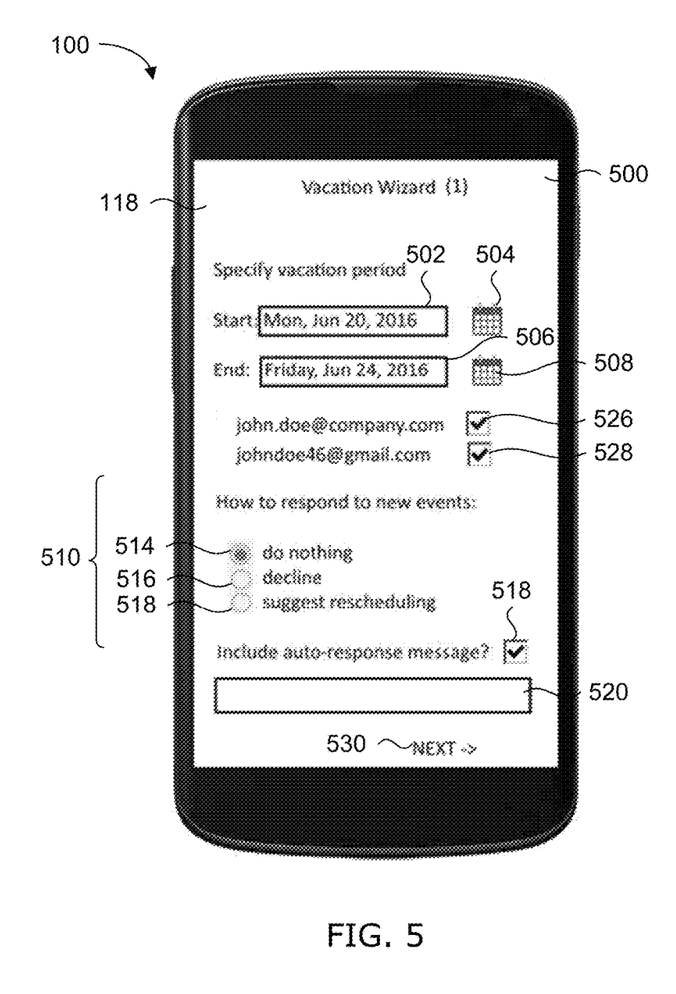
FIG. 5 through FIG. 8 illustrate an example of a user interface for performing an action associated with identified scheduled events in accordance with the flowchart of FIG. 4.

FIG. 5 shows a first UI page 500 of the out-of-office wizard UI. The first UI page 500 shown in FIG. 5 includes a start field 502 and a start calendar icon 504 for entering the start of the out-of-office period, an end field 306 and an end calendar icon 508 for entering the end of the out-of-office period. The first page 500 includes a field 510 for entering the out-of-office preference associated with responding to new invitations to events occurring within the out-of-office period. The field 510 includes a first selectable feature 512 associated with a "do nothing" preference, a second selectable feature 514 associated with a "decline" preference, and a third selectable feature 516 associated with a "suggest reschedule" preference. The first page 500 also includes a message selectable element 518 for inputting an out-of-office preference for a message to be included with the response that is automatically transmitted at 410, as well as a text box 520 to receive input text to be included in the automatically transmitted response. Further, account selectable features 526 and 528, each associated with a respective email account, and may be utilized to select which accounts the automatic transmission of responses at 206 is applied to. The elements 502 through 520 and 526 and 528 included on the example first UI page 500 shown in FIG. 5 are substantially similar to the elements 302 through 320 and 326 and 328 included in the UI 300 previously described, and therefore are not further described here to avoid repetition.

Figure 6:
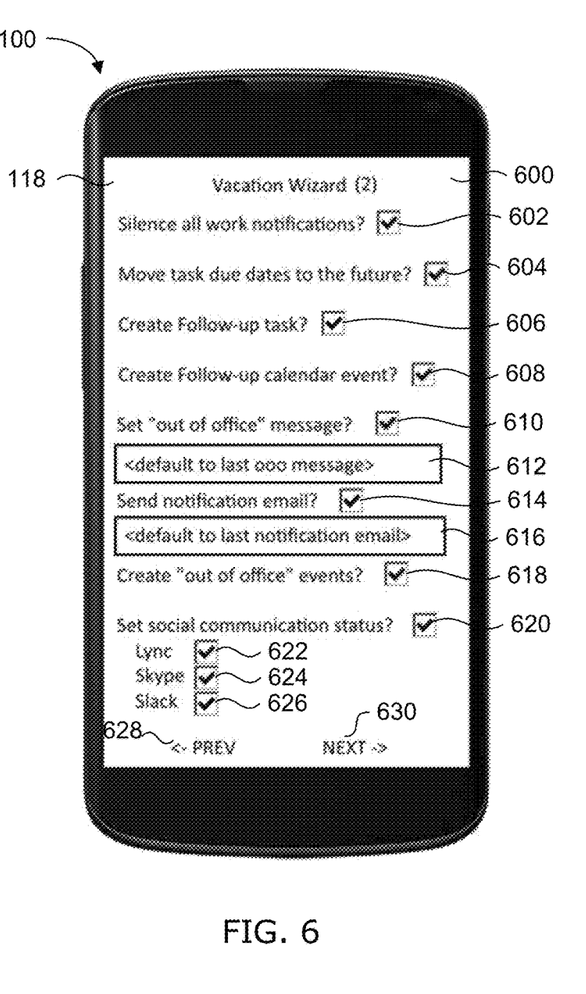

When all of the desired information has been entered on the first UI page 500, a user may select the "NEXT" button 530 to take the user to the second UI page 600 of the out-of-office wizard, which is shown in FIG. 6. The second UI page 600 includes a notifications selectable option 602 which, if selected, includes in the out-of-office preferences a preference to silence notifications during the out-of-office period at 412. In the example second page 600 shown, the notification selectable feature 602 applies to notifications associated with the user's work account. Alternatively, the notification selectable feature 602 may similar to the notification selectable feature 325 previously described in that notifications may be turned off for selected accounts, such as the accounts selected by selectable features 526 and 528. The second UI page 600 includes a tasks selectable feature 604 which, when selected, includes in the out-of-office preferences a preference that tasks that occur during the out-of-office period be moved to after the out-of-office period ends. As previously described, moving tasks may include scanning tasks stored in association with, for example, a time management application and identifying tasks coming due during the out-of-office period.

The example second UI page 600 includes task follow-up selectable feature 606 which, when selected, causes a task reminder to be created for each task that is moved in response to selecting the task selectable feature 604. The task reminders may be created in, for example, a time management application for a date after the end of the out-of-office period to remind the user, when the user returns to the office, of the tasks that have been moved. Similarly, an event follow-up selectable feature 608 is included in the second page 600 which, when selected, causes an event reminder to be created for each calendar event that is affected, either by one of more of requesting rescheduling, cancelling, or declining the calendar event. The event reminders may be created in, for example, a time management application for a date after the end of the out-of-office period to remind the user of, for example, events that may need to be rescheduled when the user returns to the office.

The example second UI page 600 also includes an out-of-office message selectable feature 610 and text box 612. Selecting the out-of-office message selectable feature 610 causes an automatic response feature to be enabled on an email application at the start of the out-of-office period and disabled at the end of the out-of-office period. The automatic response feature causes a message to be automatically sent in response to a received email, the message indicating that the user is out of the office. The message may include text entered in the text box 612, or may include default text. The default text may be the text that was included in the message the last time that the automatic response feature was selected, as indicated by "<default to last ooo message>" displayed in the text box 612 shown in FIG. 6.

The example second UI page 600 also includes notification email selectable feature 614 and text box 616. Selecting the notification email selectable feature 614 causes a notification email to be automatically sent prior to the start of the out-of-period. The notification email includes a message that may be input in the text box 616, or may include default text. The default text may be the text that was last included in the response message the last time that the notification email selectable feature was selected, as indicated by "<default to last notification email>" displayed in the text box 616 shown in FIG. 6. The notification email may be sent out at a predetermined time before the start of the out-of-office period. The predetermined time may be input by, for example, an additional selectable feature (not shown) or may be determined by a default predetermined time. Similarly, the recipients of the notification email may be input by an additional selectable feature (not shown) or may be determined by default such as, for example, the recipients of the notification email that was sent the last time the notification email selectable feature 614 was selected.

The example second UI page 600 includes a social communication status selectable feature 620 which, when selected, sets a status of one or more social communication applications to a suitable state indicating that the user is not available such as, for example, "away" or "not available", during the out-of-office period. In the example second UI page 600, selectable features 622, 624, 626 are included which are each associated with a respective social communication application. By selecting one or more of the selectable features 622, 624, 626, the user's status in the social communications applications associated with the selected selectable features 622, 624, 626. The statuses that the social communication applications are set to may be determined by additional selectable features (not shown) or may be determined by default.

Figure 7:
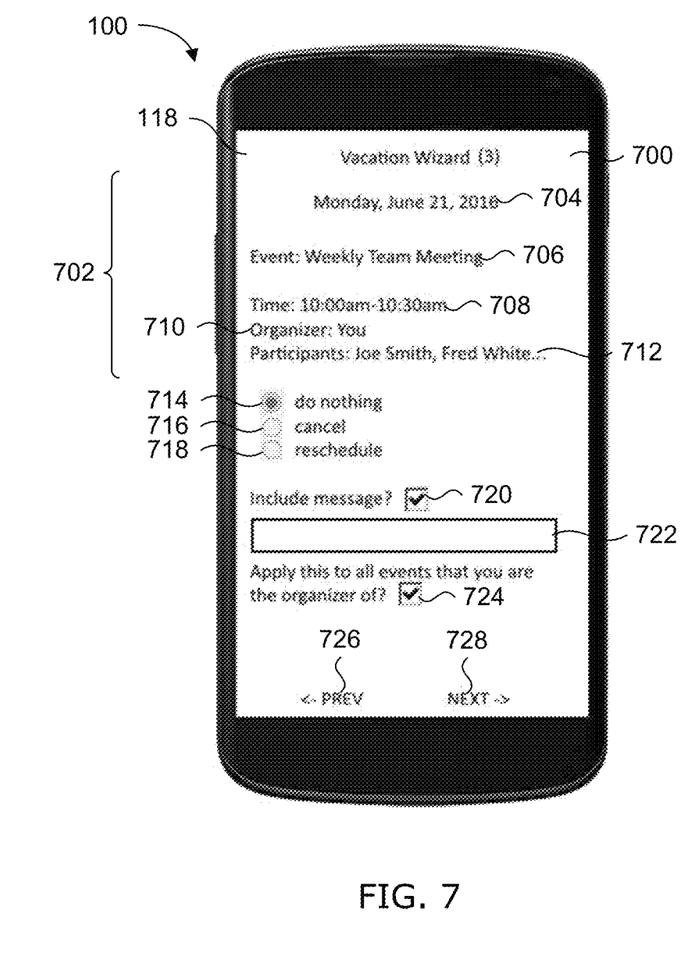

The example second UI page 600 includes a "PREV" button 528 that, when selected, causes the first UI page 500 to be displayed and a "NEXT" button 630 that, when selected, causes a third UI page 700 to be displayed. The "PREV" button 528 facilitates a user going to back to alter selections or input made on the first UI page 500.

FIG. 7 shows an example third UI page 700 of the out-of-office wizard. In the example out-of-office wizard shown, the scheduled events identified at 404 are grouped together by identified scheduled events for which the user is the organizer and for which the user is a participant, as described above. The third UI page 700 shown in FIG. 7 relates to an identified schedule event, or events, for which the user is the organizer, and the fourth UI page 800 shown in FIG. 8 relates to an identified scheduled event, or events, for which the user is a participant, as described in more detail below.

The example third UI page 700 relates a scheduled event that occurs during the out-of-office period that was identified at 404. In the example UI shown in FIG. 5 through FIG. 8, displaying the third UI page 700 and the fourth UI page 800 comprises the action performed with the respect to the identified schedule event at 406. The third UI page 700 includes displayed information 702 associated with the schedule event, including the date of the event 704, the event name 706, the event time 708, the organizer's name 710, and the participants' names 712. The displayed information 702 is determined by, for example, the event data stored in association with the scheduled event. The displayed information 702 may include more or less information than is shown in the example third UI page 700.

In addition, the third UI page 700 includes selectable features 714, 716, 718 that are associated with "do nothing", "cancel", and "reschedule", respectively. As described previously, selecting one of the selectable features 714, 716, and 718 will cause the associated action to be performed with regard to the identified schedule event. For example, selecting selectable feature 714 will result in no action being taken, selecting selectable feature 716 will cause the identified scheduled event to be cancelled, and selecting selectable feature 718 will cause the identified scheduled event to be rescheduled. The third UI page 700 includes a message selectable feature 720 and a text box 722. Selecting the message selectable feature 720 causes a message to be automatically sent to, for example, the participants associated with the identified schedule event. The message may include text that is entered into the text box 722.

Alternatively, the message may include default text. The example third UI page 700 also includes an apply selectable feature 724 which, when selecting, applies all of the selections entered on the third UI page 700 to other identified scheduled events for which the user is the organizer. If the apply selectable feature is not selected, then other identified scheduled events for which the user is the organizer may be displayed together with information similar to information 702, and with selectable features 714, 716, 718, 720 and text box 722. The next identified scheduled event may be displayed on a next UI page, or may be displayed on the third UI page, for example, below the view shown in FIG. 7 such that a user may scroll down to the next identified scheduled event.

Figure 8:
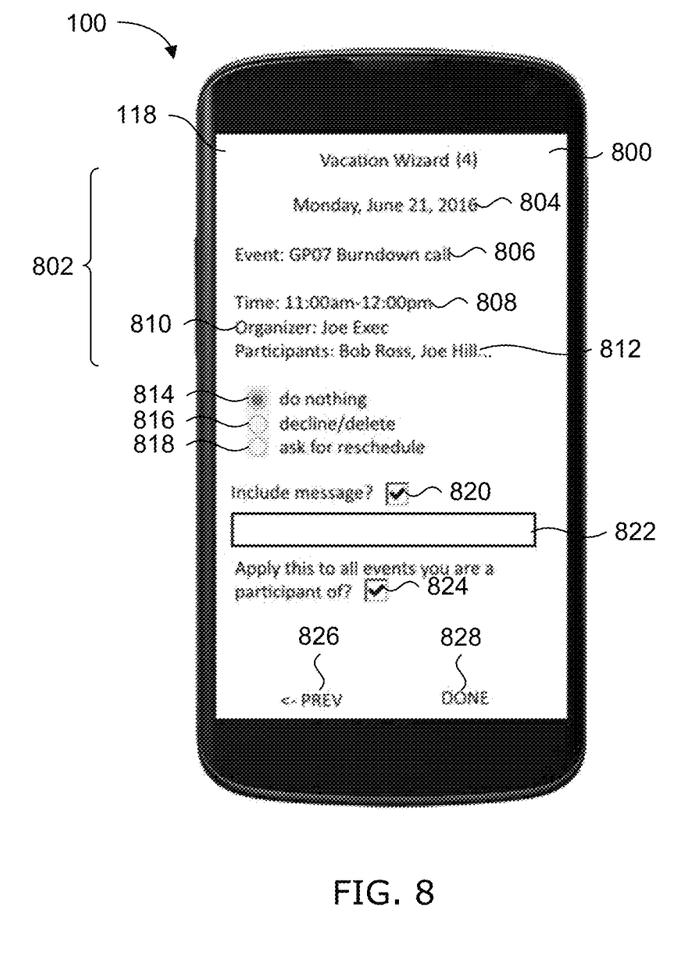

The third UI page 700 includes a "PREV" button 726 that, when selected causes the second UI page 600 to be displayed, and a "NEXT" button that, when selected, causes the fourth UI page 800 to be displayed.

FIG. 8 shows an example fourth UI page 800. As described above, the fourth UI page 800 relates to an identified scheduled event, or events, for which the user is a participant. As previously described, the user may be identified as a participant if a user has not previously declined the event. Similar to the example third UI page 700, the example fourth UI page 800 includes event information 802 including the event date 804, the event name 806, the event time 808, the organizer's name 810, and the participants' names 812. The example fourth UI page includes selectable features 814, 816, 818 that are respectively associated with "do nothing", "decline", and "ask for reschedule". These selectable features 814, 816, 818 are substantially similar to selectable features 714, 716, 718 described previously with reference to FIG. 7.

Similarly, the message selectable feature 820 and the text box 822 are substantially similar to the message selectable feature 720 and text box 720 described previously with reference to FIG. 7. An apply selectable feature 824, if selected, applies all of the selections entered on the fourth UI page 800 to the other identified scheduled events for which the user is a participant, similar to the apply selectable feature 724 described above. If the apply selectable feature 824 is not selected, then other identified scheduled events for which the user is participant will be displayed together with information similar to information 802, and with selectable features 814, 816, 818, 820 and text box 822. The next identified scheduled event may be displayed on a next UI page, or may be displayed on the fourth UI page 800, for example, below the view shown in FIG. 8 such that a user may scroll down to the next identified scheduled event.

The fourth UI page 800 includes a "PREV" button 826 that, when selected, causes the third UI page 700 to be displayed, and a "DONE" button 828 that, if selected, causes the electronic device 100 to receive the out-of-office preferences associated with the user's selections in the out-of-office wizard. As described above with regarding to UI 300, once the "DONE" button 828 is selected, any actions including, for example, automatically transmitting responses to new invitations for events occurring the out-of-office period, and turning on and off notifications and alarms, are performed as background operations of the electronic device 100.

Although the example shown in FIG. 5 through FIG. 8 includes four UI pages 500 through 800, the UI for performing the method of FIG. 4 may include greater or fewer than four UI pages, may include the UI pages 500, 600, 700, and 800 in different orders, and may include a greater or lesser number of selectable features than the selectable features shown in the example illustrated in FIG. 5 through FIG. 8. Further, the UI may not be implemented in as part of an out-of-office wizard, as shown in the example illustrated in FIG. 5 through FIG. 8.

Advantageously, the present disclosure provides a method and an electronic device for automatically transmitting responses to invitations for events occurring during an out-of-office period. Further, the present disclosure advantageously provides a method and an electronic device for automatically turning off notifications or alarms or both. By automatically responding to invitations for events occurring during an out-of-office period, as well as performing other actions including, for example, turning off alarms and notifications, identifying scheduled events occurring during the out-of-office period, the amount of time a user spends interacting with an electronic device to prepare for an out-of-office period may be reduced.

The scope of the claims should not be limited by the preferred embodiments set forth in the examples, but should be given the broadest interpretation consistent with the description as a whole.

What is claimed is:

1. A method comprising:
receiving at an electronic device data associated with an out-of-office period, the data including a start date of the out-of-office period;
receiving at the electronic device a calendar invitation associated with an application of the electronic device, the calendar invitation having event data associated with an event scheduled to occur during the out-of-office period;
automatically transmitting by the electronic device a response declining the calendar invitation; and
in response to determining that a current date is the start date, automatically turning off at least some notifications at the electronic device;
wherein the data associated with the out-of-office period does not comprise event data of an event associated with the application.

2. The method of claim 1, wherein:
the data associated with the out-of-office period comprises a start time of the out-of-office period; and
automatically turning off at least some notifications at the electronic device is performed in response to determining that a current time is the start time.

3. The method of claim 1, wherein the data associated with the out-of-office period comprises an end of the out-of-office period.

4. The method of claim 1, wherein the response is configurable.

5. The method of claim 1, wherein the response comprises a default message.

6. An electronic device comprising:
a communication system for sending and receiving communications;
at least one input device for receiving input at the electronic device;
a processor coupled to the communication system, the input device, and the display and programmed to:
receive at the electronic device data associated with an out-of-office period, the data including a start date of the out-of-office period;
receive at the electronic device a calendar invitation associated with an application of the electronic device, the calendar invitation having event data associated with an event scheduled to occur during the out-of-office period;
automatically transmit by the electronic device a response declining the calendar invitation; and
in response to a determination that a current date is the start date, automatically turn off at least some notifications at the electronic device;
wherein the data associated with the out-of-office period does not comprise event data of an event associated with the application.

7. The electronic device according to claim 6, wherein:
the data associated with the out-of-office period comprises a start time of the out-of-office period; and
the processor is programmed to, in response to a determination that a current time is the start time, automatically turn off at least some notifications at the electronic device.

8. The electronic device according to claim 6, wherein the data associated with the out-of-office period comprises an end of the out-of-office period.

9. The electronic device according to claim 6, wherein the response is configurable.

10. The electronic device according to claim 6, wherein the response comprises a default message.

11. The electronic device of claim 6, wherein the process is configured to turn on at least some notifications at the electronic device once the out-of-office period has ended.

12. A non-transitory computer-readable medium having stored thereon computer-readable code executable by a processor to cause the processor to:
receive at the electronic device data associated with an out-of-office period, the data including a start date of the out-of-office period;
receive at the electronic device a calendar invitation associated with an application of the electronic device, the calendar invitation having event data associated with an event scheduled to occur during the out-of-office period;
automatically transmit by the electronic device a response declining the calendar invitation; and
in response to a determination that a current date is the start date, automatically turn off at least some notifications at the electronic device-automatically turn off at least some notifications at the electronic device;
wherein the data associated with the out-of-office period does not comprise event data of an event associated with the application.

13. The non-transitory computer-readable medium according to claim 12, wherein:
the data associated with the out-of-office period comprises a start time of the out-of-office period; and the computer-readable code is executable by the processor to cause the processor to, in response to a determination that a current time is the start time, automatically turn off at least some notifications at the electronic device.

14. The non-transitory computer-readable medium according to claim 12, wherein the data associated with the out-of-office period comprises an end of the out-of-office period.

15. The non-transitory computer-readable medium according to claim 12, wherein the response is configurable.

16. The non-transitory computer-readable medium according to claim 12, wherein the response comprises a default message.

17. The method of claim 1, further comprising turning on at least some notifications at the electronic device once the out-of-office period has ended.

18. The non-transitory computer-readable medium of claim 12, wherein the computer-readable code is executable by a processor to cause the processor to turn on at least some notifications at the electronic device once the out-of-office period has ended.

\* \* \* \* \*